Patented Aug. 25, 1942

2,294,130

UNITED STATES PATENT OFFICE 2,294,130

MANUFACTURE OF DICARBOXYLIC ACID ANHYDRIDE

Frank Porter, Syracuse, N. Y., assignor to The Solvay Process Company, New York, N. Y., a corporation of New York No Drawing. Application June 4, 1941, Serial No. 396,641. In Canada December 2, 1935

22 Claims. (Cl. 260—342)

This invention relates to the manufacture of dicarboxylic acid anhydrides and is particularly concerned with the manufacture of phthalic anhydride and maleic anhydride by catalytic vapor phase oxidation by means of new and improved catalytic materials.

In the commercial production of the dicarboxylic acid anhydrides by partial oxidation of organic compounds, it has been the practice to pass a mixture of oxygen-containing gas, such as air, and vapor of the compound to be oxidized into contact with a vanadium catalyst, such as vanadium pentoxide or a mixture of the pentoxide with the tetroxide, at a temperature between 400° C. and 600° C. In the manufacture of maleic anhydride it is advantageous to employ a substantial proportion of molybdenum oxide as a part of the catalyst mass.

While the prior processes have given good yields of the desired reaction products, there has been substantial room for improvement. Thus in the manufacture of phthalic anhydride as much as 20% or 30% of the naphthalene employed may be converted to undesired by-products, almost entirely carbon dioxide and water; these by-products represent a substantial naphthalene loss. In the manufacture of maleic anhydride as much as 50% or 60% of the benzene employed may be converted to by-products, again almost entirely carbon dioxide and water.

It is an object of the present invention to provide catalysts and processes for using them which increase the yields of dicarboxylic acid anhydrides obtainable by vapor phase catalytic partial oxidation of aliphatic and aromatic compounds; particularly the mono- and di-nuclear aromatic compounds, such as benzene, toluene, naphthalene, methyl-naphthalene, diphenyl, and their lower oxidation products, such as benzoquinone and naphthoquinone; and the aliphatic and alicyclic compounds containing 4 or more carbon atoms, such as butane, heptane, isooctane, butene-2, cyclohexane, furane, and furfural; and mixtures thereof, such as hydrocarbon oils of the gasoline or gas oil type or distillate fractions thereof, obtained by simply distilling or by cracking and fractionating or by catalytically hydrogenating or hydrogenating-cracking and fractionating petroleum or petroleum fractions, or by polymerizing normally vaporous or gaseous hydrocarbons. Usually maleic anhydride is prepared from compounds containing less than 10 carbon atoms per molecule and phthalic or mixtures of maleic and phthalic are obtained from compounds containing 10 to 15 carbon atoms per molecule.

It is a further object to provide catalysts possessing high activity and long life in such oxidation processes.

Further objects will be apparent from the description of my invention given below.

To accomplish the purposes of my invention I provide in a dicarboxylic-anhydride-forming vanadium catalyst a small proportion of a phosphate. The proportion of phosphate may vary from an exceedingly small proportion, for instance from a molecular ratio of $P_2O_5$ to $V_2O_5$ of 0.08%, up to about 20%. Catalysts for manufacture of maleic anhydride may suitably contain $V_2O_5$ and $MoO_3$ in a weight ratio from 15:1 down to 1:2, but preferably around 3:1.

The effect of the phosphate in the dicarboxylic-anhydride-forming vanadium catalysts is two-fold; first, the ratio of dicarboxylic anhydride to by-products is increased, and second, the violence of the reaction is diminished.

The second effect, especially notable with ratios of $P_2O_5$ to $V_2O_5$ between 2% and 20%, is of advantage primarily in the manufacture of phthalic anhydride, where it facilitates control of the reaction. By employing various proportions of the phosphate, catalysts of variant activities may be provided to control the reaction rate pattern in the catalyst mass as described and claimed in United States Patent 2,142,678 issued January 3, 1939, to The Solvay Process Company.

In the production of maleic anhydride a reduction of catalyst activity to the extent obtainable by employing proportions of phosphate within the higher section of the range mentioned above ordinarily is not desirable at normal pressures. However, at elevated pressures the proportion of the phosphate should be increased as the reaction pressure is increased in order to obtain equivalent results; for instance, for a one stage process at ordinary atmospheric pressure the optimum proportion of $P_2O_5$ is in the neighborhood of two-fifths mol per cent of the $V_2O_5$, while at ten atmospheres pressure it is preferable to increase this proportion to around two and one-half per cent.

The catalysts of the invention may be prepared in the customary manner and the phosphate may be added at any suitable point in the process, or the final catalyst may be immersed in a phosphate solution and then dried. The phosphate may be added in the form of phosphoric or phosphomolybdic acid or in the form of an ammonium phosphate or a metal phosphate, such as vanadium phosphate. In the case of the ammonium phosphates, the ammonia is expelled upon heating the catalyst to reaction temperature.

The following examples illustrate the preparation of catalysts of this invention. Parts are by weight.

Catalyst A (a maleic anhydride catalyst)

146.2 parts of commercial ammonium vanadate (85% $NH_4VO_3$) are dissolved in hot water, heated for one hour at 80° C. and filtered, while hot, to remove insoluble impurities. Concentrated nitric acid is then added slowly with stirring until the mixture is slightly acid. The resultant "yellow vanadium salt" is filtered off and dried. 39.6 parts of molybdenum trioxide ($MoO_3$) are dissolved in 590 parts of concentrated hydrochloric acid (about 36% HCl). The dry vanadium "salt" is mixed with the molybdenum trioxide solution. 1180 parts of concentrated hydrochloric acid are added and the mixture is heated until solution is complete. An amount of phosphoric acid equivalent to 0.44 part of $P_2O_5$ is added. 1143 parts of 6 to 10 mesh alundum, previously pickled in hydrochloric acid, are added to the solution and the mixture is evaporated to dryness with constant stirring. The catalyst is roasted in a stream of air for several hours, the temperature being raised gradually to 500° C. during this period. (This roasting preferably is accomplished after the catalyst has been charged into the converter.)

The final catalyst of the above example contains the phosphate in a $P_2O_5:V_2O_5$ mol ratio of 0.6%; it is especially suited for the manufacture of maleic acid anhydride.

Catalyst B (a phthalic anhydride catalyst)

116 parts of ammonium vanadate are dissolved in water at 80° to 90° C. to provide a 4% solution. The solution is filtered to remove any insoluble impurities. To the hot filtered solution aqueous 20% nitric acid solution is added until the vanadate solution is just slightly acid to Congo Red. The resulting mixture is heated at boiling temperature for one hour and then is allowed to settle. The precipitated vanadium compound is separated from solution by filtration, washed with 1400 parts of distilled water containing one part of nitric acid and finally is dried in a suitable drying apparatus. The resultant 90 parts of vanadium pentoxide (in hydrated form) are dissolved in 1000 parts of concentrated hydrochloric acid. 12½ parts of 80% phosphoric acid are added and the mixture is concentrated by evaporation until the volume of the solution is about equal to the bulk volume of 900 parts of the alundum support, which may be in the form of particles of 8 to 14 mesh; this quantity of the support is then added and the solution in admixture with the alundum is evaporated to dryness with continuous stirring. The product is roasted in a current of air as in the previous example. It contains phosphate in a $P_2O_5:V_2O_5$ mol ratio of 10%.

Catalyst C (a phthalic anhydride catalyst)

3.9 parts of vanadium pentoxide (92% $V_2O_5$) are dissolved in about 60 parts of hydrochloric acid (about 36% HCl). About 1½ parts of about 5% phosphoric acid solution are added. 20 parts of 8 to 10 mesh diatomite brick are immersed in the solution and the mixture is evaporated to dryness while stirring. The product is roasted in air as in the previous examples. It contains a $P_2O_5:V_2O_5$ mol ratio of about 2%.

Other processes may be used for preparing the catalysts of the present invention; for instance, the process of United States Patent No. 2,081,272 issued May 25, 1937 to National Aniline and Chemical Company, Inc., may be used, in which case the phosphate in the form of phosphoric acid, ammonium phosphate or a metal phosphate, may be added in place of the potassium sulfate or potassium hydroxide referred to in the patent specification, for example; and in making catalysts of the type of Catalyst A, molybdenum chloride in the necessary amount may be added along with the phosphoric acid or phosphate.

While Catalyst A is indicated to be a maleic anhydride catalyst and Catalysts B and C are indicated to be phthalic anhydride catalysts, it should be understood that phthalic anhydride can be produced with Catalyst A, and maleic anhydride with Catalysts B and C; however, so used, the catalysts do not provide as satisfactory results as when they are employed for the designated processes.

In place of the alundum and diatomite set forth above, any other suitable catalyst support may be employed, for example crushed silica brick or metal fragments, such as fragments of aluminum.

While the molecular structure of the types of catalysts described above is not known with the absolute certainty, these catalysts are generally regarded as non-basic vanadium or vanadic oxide catalysts and are to be distinguished from relatively basic catalysts of the alkali-metal vanadate type.

The catalysts should be free from amounts of water-soluble alkali-metal compounds and of alkaline earth metal compounds providing as much as 2 gram equivalents of alkali-metals and alkaline earth metals per gram atom of phosphorus. This limitation has reference to the catalytic material which is exposed to the reaction mixture and not to coated carriers since as long as the material is not exposed it can not do much harm. The presence of alkalies in the form of silicates which are stable under the conditions of the process, as present for example in insoluble glass and firebrick, do not seem to have a deleterious effect. Thus the catalysts may be supported on such materials.

The phosphorus in the catalysts of the present invention may or may not be present in chemical combination with the vanadium or molybdenum oxide constituents of the catalyst.

The catalysts of the present invention may be used in the same manner as previously known vanadium catalysts. For instance, they may be employed at temperatures from about 400° C. to about 600° C. in a converter of the type provided with a number of catalyst tubes immersed in a cooling liquid such as boiling mercury or a molten salt, as described in United States Patent 2,142,678 referred to above, or in an adiabatic converter as described in United States Patent 2,071,361. Their use is by no means restricted to these particular types of converters since they may be used in any convenient type of apparatus with or without external cooling media.

Table 1 below gives some comparative results on the oxidation of naphthalene to phthalic anhydride in an externally cooled tubular converter. A naphthalene air mixture containing naphthalene vapor in the concentration indicated, expressed as volume per cent, was employed in each instance at the indicated space velocity, expressed in terms of volumes of gas at standard temperature and pressure (0° C., 760 mm.) per volume of catalyst zone per hour.

Table 1

| Test No. | Catalyst temperature (maximum) | $C_{10}H_8$ concentration | Space velocity | Mols of PAA per 100 mols of naphthalene input |
|---|---|---|---|---|

CATALYST: 10% $V_2O_5$, 90% ALUNDUM

| | °C. | | | |
|---|---|---|---|---|
| 1 | 475 | 0.75 | 4,000 | 77 |

CATALYST: B

| | °C. | | | |
|---|---|---|---|---|
| 2 | 475 | 0.75 | 4,000 | 84 |
| 3 | 500 | 0.75 | 4,000 | 84 |
| 4 | 525 | 0.75 | 4,000 | 82 |

CATALYST: C

| | | | | Mols of dibasic acid per 100 mols naphthalene input |
|---|---|---|---|---|
| | °C. | | | |
| 5 | 456 | 0.22 | 3,240 | 86 |
| 6 | 495 | 0.24 | 3,325 | 92 |
| 7 | 535 | 0.22 | 3,090 | 95 |

Table 2 below illustrates the application of the catalysts of my invention to the production of maleic anhydride from benzene in a similar converter. Air benzene vapor mixtures of various concentrations were employed. The concentration of benzene vapor in the mixture is expressed in mol (volume) per cent. Space velocity is expressed in volumes of gas at standard temperature and pressure per volume of catalyst zone per hour. The catalyst temperature given is that for the zone of maximum temperature. In this table data on duration of previous operation of some of the catalysts are given to show the relative effect of time upon the catalysts as well as their relative activity and selectivity. From these data it may be seen that the catalysts of the present invention not only provide higher yields of maleic anhydride but produce high yields more consistently over long periods of time than the ordinary types of catalyst. Except where otherwise indicated, catalysts were prepared by the hydrochloric acid method as set forth above for Catalyst A. "%" of catalyst is based on the total catalyst mass. Except where otherwise indicated, the catalyst support was 6 to 10 mesh alundum.

Table 2

| Test No. | Days | Catalyst temperature | Benzene concentration | Space velocity | Percent benzene attacked | Mols of MAA per 100 mols benzene attacked |
|---|---|---|---|---|---|---|

Catalyst: 11.6% $V_2O_5$, 4.16% $MoO_3$ ª

| | | °C. | Percent | | | |
|---|---|---|---|---|---|---|
| 1 | 4.5 | 475 | 1 | 6,000 | 56 | 65 |
| 2 | 50.0 | 475 | 1 | 6,100 | 73 | 66 |
| 3 | 115.0 | 475 | 1 | 6,100 | 62 | 68 |
| 4 | 2.7 | 525 | 1 | 12,000 | 63 | 65 |
| 5 | 57.0 | 525 | 1 | 12,200 | 48 | 68 |
| 6 | 103.0 | 525 | 1 | 12,200 | 60 | 67 |

Catalyst: 11.4% $V_2O_5$, 3.9% $MoO_3$, 0.034% $P_2O_5$ ²

| 7 | 40 | 475 | 1 | 6,100 | 70 | 70 |
|---|---|---|---|---|---|---|
| 8 | 90 | 475 | 1 | 6,100 | 69 | 70 |
| 9 | 109 | 475 | 1 | 6,100 | 58 | 70 |
| 10 | 5.7 | 525 | 1 | 12,200 | 64 | 68 |
| 11 | 50 | 525 | 1 | 12,200 | 72 | 69 |
| 12 | 105 | 525 | 1 | 12,200 | 66 | 68 |

Catalyst: 11.6% $V_2O_5$, 4.16% $MoO_3$, 0.038% $P_2O_5$ ª¹

| 13 | 2.7 | 475 | 1.01 | 6,100 | 72 | 69 |
|---|---|---|---|---|---|---|
| 14 | 19 | 525 | 0.27 | 6,100 | 87 | 72 |

Catalyst: 11.6% $V_2O_5$, 4.16% $MoO_3$

| 15 | 3 | 475 | 0.98 | 8,240 | 52 | 69 |
|---|---|---|---|---|---|---|
| 16 | 2 | 484 | 0.97 | 3,160 | 91 | 61 |
| 17 | 2 | 498 | 0.96 | 3,165 | 97 | 57 |
| 18 | 2 | 516 | 0.94 | 3,220 | 99 | 52 |

Catalyst: 11.4% $V_2O_5$, 3.9% $MoO_3$, 0.034% $P_2O_5$ ²

| 19 | <1 | 475 | 0.87 | 3,120 | 61 | 75 |
|---|---|---|---|---|---|---|
| 20 | <1 | 475 | 1.07 | 1,364 | 78 | 72 |
| 21 | <1 | 475 | 0.35 | 3,470 | 85 | 75 |
| 22 | 1 | 475 | 0.33 | 2,375 | 99 | 72 |

Catalyst: 8.6% $V_2O_5$, 3.0% $MoO_3$ on 8-10 mesh Alundum

| 23 | 2 | 500 | 1.09 | 2,900 | 96 | 58 |
|---|---|---|---|---|---|---|

Catalyst: 8.6% $V_2O_5$, 3.0% $MoO_3$, 0.1% $P_2O_3$ on 8-10 mesh Alundum

| 24 | <1 | 475 | 1.13 | 1,180 | 92 | 76 |
|---|---|---|---|---|---|---|
| 25 | 61 | 478 | 1.13 | 1,254 | 96 | 71 |
| 26 | <1 | 525 | 1.19 | 1,195 | 98 | 71 |

¹ $P_2O_5$:$V_2O_5$ mol ratio = .42% approx.
² $P_2O_5$:$V_2O_5$ mol ratio = .38% approx.
³ $P_2O_5$:$V_2O_5$ mol ratio = 1.5% approx.
ª Catalyst prepared by the method of U. S. P. 2,081,272.

The above tests were all conducted at substantially atmospheric pressure, only sufficient pressure being employed to force the vapor mixture through the catalyst mass and recovery system.

The following table shows results that may be obtained at higher than atmospheric pressure. A pressure of 10 atmospheres was employed.

Table 3

| Test No. | Space velocity | Catalyst temperature (maximum) | Benzene concentration | Percent benzene attacked | Mols of MAA produced per 100 mols benzene attacked |
|---|---|---|---|---|---|

Catalyst: 11.6% $V_2O_5$, 4.16% $MoO_3$, 0.23% $P_2O_5$¹ on 6-10 mesh Alundumª²

| | | °C. | Percent | | |
|---|---|---|---|---|---|
| 1 | 3,000 | 400 | 1.0 | 46 | 77 |
| 2 | 6,000 | 440 | 1.1 | 62 | 64 |

¹ $P_2O_5$:$V_2O_5$ mol ratio = 2½%.
ª Prepared by the method of U. S. P. 2,081,272.

The following table further illustrates the application of the catalyst to the manufacture of dicarboxylic acid anhydrides.

Table 4

| Test No. | Catalyst | Mol percent of compound in air | Space velocity | Catalyst temperature (maximum) | Attacked | Mols of dicarboxylic acid anhydride per 100 mols of compound attacked | | |
|---|---|---|---|---|---|---|---|---|
| | | | | | | PAA | MAA | Total anhydride |
| | | | | °C. | Percent | | | |
| 1 | 10% $V_2O_5$ on 4-10 mesh alundum | 0.075% of diphenyl | 4,000 | 450 | 100 | 30 | 28 | 58 |
| 2 | 10% $V_2O_5$, 1¼% $P_2O_5$[1] on 4-10 mesh alundum | 0.075% of diphenyl | 4,000 | 450 | 100 | 17 | 50 | 68 |
| 3 | 11.4% $V_2O_5$, 3.9% $MoO_3$, 0.034% $P_2O_5$[1] on 6-10 mesh alundum | 0.036% of diphenyl | 4,000 | 452 | 100 | 15 | 53 | 68 |
| 4 | ...do... | 0.11% of diphenyl | 4,000 | 450 | 100 | 32 | 44 | 76 |
| 5 | 8.6% $V_2O_5$, 3.0% $MoO_3$ on 8-10 mesh alundum | 0.94% of cyclohexane | 2,000 | 535 | 90 | | 59 | |
| 6 | 8.6% $V_2O_5$, 3.0% $MoO_3$, 0.1% $P_2O_5$[3] on 8-10 mesh alundum | 1.02% of cyclohexane | 4,000 | 535 | 91 | | 63 | |
| 7 | 8.6% $V_2O_5$, 3.0% $MoO_3$, 0.1% $P_2O_5$[3] on 8-10 mesh alundum | 1.00% of cyclohexane | 2,000 | 535 | 99+ | | 46 | |
| 8 | 8.6% $V_2O_5$, 3.0% $MoO_3$ on 8-10 mesh alundum | 1.00% of heptane [a] | 2,000 | 525 | 91 | | 31 | |
| 9 | 8.6% $V_2O_5$, 3.0% $MoO_3$, 0.1% $P_2O_5$[3] on 8-10 mesh alundum | 0.93% of heptane [a] | 4,000 | 535 | 91 | | 38 | |

[1] $P_2O_5:V_2O_5$ mol ratio = .38%.
[2] $P_2O_5:V_2O_5$ mol ratio = 16%.
[3] $P_2O_5:V_2O_5$ mol ratio = 1¼%.
[a] "Skellysolve-C," a commercial petroleum hydrocarbon fraction essentially heptanes, boiling range 86°–100° C.

In the application of the phosphate-modified catalysts of this invention to the manufacture of maleic anhydride, it is ordinarily desirable to avoid reducing the reaction rate to any greater extent than necessary. As will be observed from a comparison of tests 1 to 6 with tests 7 to 14 of Table 2, proportions of phosphate below a concentration corresponding to a $P_2O_5$ to $V_2O_5$ mol ratio of about ½% have no material decelerating effect upon the oxidation of benzene to maleic anhydride. In fact, a comparison of test 13 with tests 1 to 3 would indicate that the phosphate-modified catalyst was slightly more active than the unmodified catalyst. Accordingly it will be apparent that a definite improvement in efficiency may be obtained by the employment of such small proportions of phosphate that little or no decelerating effect is produced.

Large proportions of phosphate tend further to improve the efficiency of reaction but also exert a noticeable repressing effect upon the reaction. In employing such proportions of phosphate, for example proportions corresponding to a $P_2O_5$ to $V_2O_5$ mol ratio above ½%, it is advantageous to modify the oxidation system somewhat. Highly satisfactory results may be obtained for example by conducting the oxidation in two stages, employing in the first stage either an unmodified vanadium molybdenum catalyst or such a catalyst modified with a proportion of phosphate giving a $P_2O_5$ to $V_2O_5$ mol ratio up to ½%, and employing in the second stage a catalyst modified with sufficient phosphate to provide a $P_2O_5$ to $V_2O_5$ mol ratio above ½%. By providing sufficient of the relatively active catalyst to effect conversion of 60% to 70% of the benzene and utilizing the more strongly modified catalyst for completing the oxidation, the converter capacity is utilized to a maximum degree while still obtaining the benefits of a highly modified catalyst. Since the most serious loss of maleic anhydride yield normally occurs when the concentration of maleic anhydride is relatively high compared with the concentration of benzene, even an unmodified vanadium molybdenum catalyst may be employed in the early stages of the reaction without materially reducing the final yield of maleic anhydride.

For conducting the process in two stages a single multi-tubular converter containing the two catalysts disposed successively or a pair of converters arranged in series may be used. For instance, an apparatus similar to that described in my U. S. Patent 2,117,359 may be employed. This apparatus comprises a tubular converter containing the catalyst distributed in externally cooled tubes as a first-stage converter, an intercooler, and an adiabatic converter containing the catalyst supported on one or more trays, without provision of cooling means, as a second-stage converter.

In the present instance the method of operating is considerably different from that described in the aforesaid patent, in that the reaction mixture is passed sufficiently rapidly so that only 60% to 70% of the initial material is oxidized in the first stage converter and thus 30% to 40% of the initial material enters the second-stage converter; the latter should be designed with sufficient capacity to complete the oxidation to 95% to 100% conversion of the initial material. Operating temperatures are those customarily employed for this type of operation; thus both converters may be operated to provide reaction temperatures between 400° and 600° C.

In view of the important advantages gained by the use of a pair of catalysts containing in the first catalyst not more than a ½% mol ratio of $P_2O_5$ to $V_2O_5$ and in the second catalyst a more than ½% mol ratio of $P_2O_5$ to $V_2O_5$, this constitutes a preferred embodiment of the invention as applied to the manufacture of maleic anhydride.

This application is in part a continuation of my application Serial No. 211,805, filed June 4, 1938.

I claim:

1. In the vapor phase catalytic partial oxidation process for the manufacture of a dicarboxylic acid anhydride, the improvement which comprises conducting the oxidation in contact with a vanadium catalyst containing a phosphate in a proportion corresponding to a $P_2O_5$ to $V_2O_5$ mol ratio between 0.08% and 20%, said catalyst being free from amounts of water-soluble alkali-metal compounds and of alkaline earth metal compounds providing as much as 2 gram equivalents of alkali-metals and alkaline earth metals per gram atom of phosphorus.

2. In the vapor phase catalytic partial oxidation process for the manufacture of maleic anhydride, the improvement which comprises conducting the oxidation in contact with a supported catalyst comprising a carrier coated with a layer of vanadium oxide molybdenum oxide catalyst containing a phosphate in a proportion corresponding to a $P_2O_5$ to $V_2O_5$ mol ratio between 0.08% and 2½%, said catalyst layer being free from amounts of water-soluble alkali-metal compounds and of alkaline earth metal compounds providing as much as 2 gram equivalents of alkali-metals and alkaline earth metals per gram atom of phosphorus.

3. In the vapor phase catalytic partial oxidation process for the manufacture of phthalic anhydride, the improvement which comprises conducting the oxidation in contact with a supported catalyst comprising a carrier coated with a layer of vanadium oxide catalyst containing a phosphate in a proportion corresponding to a $P_2O_5$ to $V_2O_5$ mol ratio between 2% and 20%, said catalyst layer being free from amounts of water-soluble alkali-metal compounds and of alkaline earth metal compounds providing as much as 2 gram equivalents of alkali-metals and alkaline earth metals per gram atom of phosphorus.

4. The process of making a dicarboxylic acid anhydride from hydrocarbons containing at least 4 carbon atoms and lower oxidation products thereof, which process comprises passing a mixture of vapor of the compound to be oxidized and oxygen-containing gas into contact with a vanadium catalyst containing a phosphate in a proportion corresponding to a $P_2O_5$ to $V_2O_5$ mol ratio between 0.08% and 20% at a temperature between 400° C. and 600° C., said catalyst being free from amounts of alkali-metal and alkaline earth metal compounds, other than stable, water-insoluble silicates, providing as much as 2 gram equivalents of alkali-metals and alkaline earth metals per gram atom of phosphorus.

5. In the vapor phase catalytic partial oxidation process for the manufacture of maleic anhydride, the improvement which comprises effecting said oxidation at a temperature between 400° C. and 600° C. in contact with a non-basic vanadium molybdenum catalyst containing the vanadium and molybdenum in proportions corresponding to a weight ratio of $V_2O_5$ to $MoO_3$ between 15:1 and 1:2 and containing a non-basic phosphate in a proportion corresponding to a $P_2O_5$ to $V_2O_5$ mol ratio between 0.08% and 2½%, said catalyst being further distinguished by its ability to form a noticeably higher ratio of maleic anhydride to by-products in the oxidation product when compared with a catalyst free from phosphorus but having otherwise the same constitution.

6. In the vapor phase catalytic partial oxidation process for the manufacture of phthalic anhydride, the improvement which comprises effecting said oxidation at a temperature between 400° C. and 600° C. in contact with a non-basic vanadium catalyst containing a non-basic phosphate in a proportion corresponding to a $P_2O_5$ to $V_2O_5$ mol ratio between 2% and 20%, said catalyst being further distinguished by its ability to form a noticeably higher ratio of phthalic anhydride to by-products in the oxidation product when compared with a catalyst free from phosphorus but having otherwise the same constitution.

7. The process of making a dicarboxylic acid anhydride from hydrocarbons containing at least 4 carbon atoms and lower oxidation products thereof, which process comprises passing a mixture of vapor of the compound to be oxidized and oxygen-containing gas into contact with a vanadium oxide catalyst containing a phosphate in a proportion corresponding to a $P_2O_5$ to $V_2O_5$ mol ratio between 0.08% and 20% at a temperature between 400° C. and 600° C., said catalyst being characterized by the absence therefrom of water-soluble alkali-metal and alkaline earth metal compounds.

8. The process of making maleic anhydride from hydrocarbons containing 4 to 9 carbon atoms and lower oxidation products thereof, which comprises passing a mixture of vapor of the compound to be oxidized and oxygen-containing gas into contact with a vanadium oxide molybdenum oxide catalyst containing the vanadium and molybdenum in proportions corresponding to a weight ratio of $V_2O_5$ to $MoO_3$ between 15:1 and 1:2 and containing a phosphate in a proportion corresponding to a $P_2O_5$ to $V_2O_5$ mol ratio between 0.08% and 2½%, at a temperature between 400° C. and 600° C., said catalyst being characterized by the absence therefrom of water-soluble alkali-metal and alkaline earth metal compounds.

9. The process of making phthalic anhydride from hydrocarbons containing 10 to 15 carbon atoms and lower oxidation products thereof, which process comprises passing a mixture of vapor of the compound to be oxidized and oxygen-containing gas into contact with a vanadium oxide catalyst containing a phosphate in a proportion corresponding to a $P_2O_5$ to $V_2O_5$ mol ratio between 2% and 20%, at a temperature between 400° C. and 600° C., said catalyst being characterized by the absence therefrom of water-soluble alkali-metal and alkaline earth metal compounds.

10. In the vapor phase catalytic partial oxidation process for the manufacture of a dicarboxylic acid anhydride, the improvement which comprises conducting the oxidation in contact with a vanadium oxide catalyst which is at a temperature between 400° and 600° C. and to which has been added a compound of the group consisting of phosphoric acid, phosphomolybdic acid, vanadium phosphate, and ammonium phosphate in a proportion corresponding to a $P_2O_5$ to $V_2O_5$ mol ratio between 0.08% and 20%.

11. In the vapor phase catalytic partial oxidation process for the manufacture of maleic anhydride, the improvement which comprises conducting the oxidation in contact with a vanadium oxide molybdenum oxide catalyst which is at a temperature between 400 and 600° C. and to which has been added a compound of the group consisting of phosphoric acid, phosphomolybdic acid, vanadium phosphate, and ammonium phosphate in a proportion corresponding to a $P_2O_5$ to $V_2O_5$ mol ratio between 0.08% and 2½%.

12. In the vapor phase catalytic partial oxidation process for the manufacture of phthalic anhydride, the improvement which comprises conducting the oxidation in contact with a vanadium oxide catalyst which is at a temperature between 400° C. and 600° C. and to which has been added a compound of the group consisting of phosphoric acid, phosphomolybdic acid, vanadium phosphate, and ammonium phosphate in a proportion corresponding to a $P_2O_5$ to $V_2O_5$ mol ratio between 2% and 20%.

13. The process of making a dicarboxylic acid anhydride from hydrocarbons containing at least 4 carbon atoms and lower oxidation products thereof, which process comprises passing a mixture of vapor of the compound to be oxidized and an oxygen-containing gas into contact with a vanadium catalyst at a temperature between 400° C. and 600° C. said catalyst being obtained by dissolving vanadic acid in concentrated hydrochloric acid, adding phosphoric acid, evaporating to dryness the resultant mass, and heating the dried mass in air to about 500° C., the amount of phosphoric acid being such as to provide in the vanadic catalyst mass a mol ratio of $P_2O_5$ to $V_2O_5$ between 0.08% and 20%.

14. In the manufacture of a dicarboxylic acid anhydride by vapor phase partial oxidation of a member of the group consisting of mononuclear and dinuclear aromatic compounds, the improvement which comprises passing a mixture comprising an oxygen-containing gas and vapors of said aromatic compound into contact with a catalyst obtained by dissolving vanadic acid in concentrated hydrochloric acid, adding phosphoric acid, evaporating to dryness the resultant mass, and heating the dried mass in air to about 500° C., the amount of phosphoric acid being such as to provide in the vanadic catalyst mass a mol ratio of $P_2O_5$ to $V_2O_5$ between 0.08% and 20%.

15. In the manufacture of a dicarboxylic acid anhydride by vapor phase partial oxidation of a member of the group consisting of mononuclear and dinuclear aromatic compounds, the improvement which comprises passing a mixture comprising an oxygen-containing gas and vapors of said aromatic compound into contact with a catalyst obtained by dissolving vanadic acid in concentrated hydrochloric acid, adding phosphoric acid and a catalyst carrier, evaporating to dryness the resultant mass, and heating the dried mass in air to about 500° C., the amount of phosphoric acid being such as to provide in the vanadic catalyst mass a mol ratio of $P_2O_5$ to $V_2O_5$ between 0.08% and 20%.

16. In the manufacture of maleic anhydride by vapor phase partial oxidation of benzene, the improvement which comprises passing a mixture comprising an oxygen-containing gas and vapors of benzene into contact with a catalyst obtained by dissolving vanadic acid mixed with molybdenum oxide in concentrated hydrochloric acid, adding phosphoric acid and a catalyst carrier, evaporating to dryness the resultant mass, and heating the dried mass in air to about 500° C., the amount of phosphoric acid being such as to provide in the vanadic catalyst mass a mol ratio of $P_2O_5$ to $V_2O_5$ between 0.08% and 2½%.

17. In the manufacture of phthalic anhydride by vapor phase partial oxidation of naphthalene, the improvement which comprises passing a mixture comprising an oxygen-containing gas and vapors of naphthalene into contact with a catalyst obtained by dissolving vanadic acid in concentrated hydrochloric acid, adding phosphoric acid and a catalyst carrier, evaporating to dryness the resultant mass, and heating the dried mass in air to about 500° C., the amount of phosphoric acid being such as to provide in the vanadic catalyst mass a mol ratio of $P_2O_5$ to $V_2O_5$ between 2% and 20%.

18. In the vapor phase catalytic partial oxidation process for the manufacture of maleic anhydride, the improvement which comprises conducting the oxidation progressively in contact with an active vanadium molybdenum catalyst which does not contain phosphate in a proportion corresponding to a $P_2O_5$ to $V_2O_5$ mol ratio of more than ½%, and a less active vanadium molybdenum catalyst containing a phosphate in a proportion corresponding to a $P_2O_5$ to $V_2O_5$ mol ratio between ½% and 2½%, said catalyst being free from amounts of water-soluble alkali-metal compounds and of alkaline earth metal compounds providing as much as 2 gram equivalents of alkali-metals and alkaline earth metals per gram atom of phosphorus.

19. In the vapor phase catalytic partial oxidation process for the manufacture of maleic anhydride, the improvement which comprises conducting the oxidation progressively in contact with an active non-basic vanadium molybdenum catalyst which does not contain phosphate in a proportion corresponding to a $P_2O_5$ to $V_2O_5$ mol ratio of more than ½%, and a less active non-basic vanadium molybdenum catalyst containing phosphate in a proportion corresponding to a $P_2O_5$ to $V_2O_5$ mol ratio between ½% and 2½%, said catalyst being free from amounts of alkali-metal and of alkaline earth metal compounds, other than stable, water-insoluble silicates, providing as much as 2 gram equivalents of alkali-metals and alkaline earth metals per gram atom of phosphorus.

20. In the vapor phase catalytic partial oxidation process for the manufacture of maleic anhydride, the improvement which comprises effecting oxidation of 60% to 70% of the initial material in contact with an active venadium oxide molybdenum oxide catalyst which does not contain a phosphate in a $P_2O_5$ to $V_2O_5$ mol ratio of more than ½%, then passing the resulting reaction mixture into contact with a vanadium oxide molybdenum oxide catalyst to which has been added a compound of the group consisting of phosphoric acid, phosphomolybdic acid, vanadium phosphate, and ammonium phosphate in a proportion corresponding to a $P_2O_5$ to $V_2O_5$ mol ratio between ½% and 2½% and which is less active than the first-mentioned catalyst.

21. The process for making maleic anhydride, which comprises passing a mixture of benzene vapor and air into contact with vanadium oxide molybdenum oxide catalyst which does not contain phosphate in a proportion corresponding to a $P_2O_5$ to $V_2O_5$ mol ratio of more than ½% and which is at a temperature between 400° C. and 600° C. at a sufficient rate to oxidize between 60% and 70% of the benzene initially present in the mixture and passing the resulting reaction mixture through a vanadium oxide molybdenum oxide catalyst which is at a temperature between 400° C. and 600° C. and to which has been added a compound of the group consisting of phosphoric acid, phosphomolybdic acid, vanadium phosphate and ammonium phosphate in a proportion corresponding to a $P_2O_5$ to $V_2O_5$ mol ratio between ½% and 2½% and which is less active than the first-mentioned catalyst.

22. In the vapor phase catalytic partial oxidation process for the manufacture of a dicarboxylic acid anhydride, the improvement which comprises conducting the oxidation in contact with a vanadium catalyst containing a phosphate in a proportion corresponding to a $P_2O_5$ to $V_2O_5$ mol ratio between 0.08% and 20%, said catalyst being characterized by the absence therefrom of water-soluble compounds of the alkali metals and of the alkaline earth metals.

FRANK PORTER.

CERTIFICATE OF CORRECTION.

Patent No. 2,294,130. August 25, 1942.

FRANK PORTER.

It is hereby certified that error appears in the printed specification of the above numbered patent requiring correction as follows: Page 2, second column, line 44, strike out "the" after "with"; page 3, second column, line 42, in the heading to the table for "$P_2O_3$" read --$P_2O_5$--; page 6, second column, line 33, claim 20, for "venadium" read --vanadium--; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.